United States Patent
Ye et al.

(10) Patent No.: US 8,322,620 B2
(45) Date of Patent: *Dec. 4, 2012

(54) DECODING DISTORTED SYMBOLS

(75) Inventors: Xiangyun Ye, Framingham, MA (US); Sateesha Nadabar, Framingham, MA (US)

(73) Assignee: Cognex Technology and Investment Corporation, Mt. View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/985,831

(22) Filed: Jan. 6, 2011

(65) Prior Publication Data

US 2011/0101101 A1     May 5, 2011

Related U.S. Application Data

(63) Continuation of application No. 11/312,703, filed on Dec. 20, 2005, now Pat. No. 7,878,402.

(51) Int. Cl.
  *G06K 7/10*      (2006.01)
(52) U.S. Cl. .............................. 235/462.09; 235/462.1
(58) Field of Classification Search ............. 235/462.09, 235/462.1; 382/199, 149, 218
  See application file for complete search history.

(56) References Cited

U.S. PATENT DOCUMENTS

| | | | |
|---|---|---|---|
| 5,768,443 A | 6/1998 | Michael et al. | |
| 5,862,267 A | 1/1999 | Liu | |
| 5,969,321 A * | 10/1999 | Danielson et al. | 235/462.01 |
| 6,088,482 A | 7/2000 | He et al. | |
| 6,097,839 A | 8/2000 | Liu | |
| 6,108,453 A | 8/2000 | Acharya | |
| 6,128,414 A | 10/2000 | Liu | |
| 6,215,915 B1 | 4/2001 | Reyzin | |
| 6,234,397 B1 | 5/2001 | He et al. | |
| 6,295,374 B1 | 9/2001 | Robinson et al. | |
| 6,327,393 B1 | 12/2001 | Bruder | |
| 6,340,119 B2 | 1/2002 | He et al. | |
| 6,421,458 B2 | 7/2002 | Michael et al. | |
| 6,547,139 B1 | 4/2003 | Havens et al. | |
| 6,561,428 B2 | 5/2003 | Meier et al. | |
| 6,563,324 B1 | 5/2003 | Nichani | |

(Continued)

FOREIGN PATENT DOCUMENTS

EP          1591944          2/2005

(Continued)

OTHER PUBLICATIONS

Faugeras, O. Three-Dimensional Computer Vision; A Geometric Viewpoint, MIT Press (1993).

(Continued)

*Primary Examiner* — Kristy A Haupt

(57) ABSTRACT

A method is provided for reading distorted optical symbols using known locating and decoding methods, without requiring a separate and elaborate camera calibration procedure, without excessive computational complexity, and without compromised burst noise handling. The invention exploits a distortion-tolerant method for locating and decoding 2D code symbols to provide a correspondence between a set of points in an acquired image and a set of points in the symbol. A coordinate transformation is then constructed using the correspondence, and run-time images are corrected using the coordinate transformation. Each corrected run-time image provides a distortion-free representation of a symbol that can be read by traditional code readers that normally cannot read distorted symbols. The method can handle both optical distortion and printing distortion. The method is applicable to "portable" readers when an incident angle with the surface is maintained, the reader being disposed at any distance from the surface.

23 Claims, 9 Drawing Sheets

U.S. PATENT DOCUMENTS

| | | |
|---|---|---|
| 6,658,145 B1 | 12/2003 | Silver et al. |
| 6,707,950 B1 | 3/2004 | Burns et al. |
| 6,714,679 B1 | 3/2004 | Scola et al. |
| 6,751,338 B1 | 6/2004 | Wallack |
| 6,758,399 B1 | 7/2004 | Brunelli et al. |
| 6,771,808 B1 | 8/2004 | Wallack |
| 6,798,925 B1 | 9/2004 | Wagman |
| 6,850,646 B1 | 2/2005 | Silver |
| 7,190,834 B2 | 3/2007 | Davis |
| 7,222,789 B2 | 5/2007 | Longacre, Jr. et al. |
| 7,412,106 B1 | 8/2008 | Nadabar et al. |
| 7,878,402 B2 * | 2/2011 | Ye et al. .................... 235/462.1 |
| 2003/0116628 A1 | 6/2003 | Nakazawa et al. |
| 2004/0011872 A1 | 1/2004 | Shimizu |

FOREIGN PATENT DOCUMENTS

| | | |
|---|---|---|
| JP | 2002-300402 | 10/2002 |

OTHER PUBLICATIONS

Crimisisi, I. Reid et al., A Plane Measuring Device, Image and Vision Computing, vol. 17, No, 8, pp. 625-634, (1999).

S. Tuekolsky, et al., Chapter 2 of W. Press, Numerical Recipes in C, 2nd edition Cambridge University Press, (1992).

* cited by examiner

DECODING DISTORTED SYMBOLS

CROSS REFERENCE TO RELATED APPLICATIONS

This application is a continuation of, U.S. patent application Ser. No. 11/312,703, filed Dec. 20, 2005 now U.S. Pat. No. 7,878,402.

FIELD OF THE INVENTION

This invention relates to reading symbols using machine vision, and particularly to enhanced location and/or decoding of distorted symbols.

BACKGROUND OF THE INVENTION

Automated identification of products using optical codes has been broadly implemented throughout industrial operations for many years. Optical codes are patterns composed of elements with different light reflectance or emission, assembled in accordance with predefined rules. The elements in the optical codes may be bars or spaces in a linear barcode, or a regular polygonal shape in a two-dimensional matrix code. The bar code or symbols can be printed on labels placed on product packaging, or directly on the product itself by direct part marking. The information encoded in a bar code or symbol can be decoded using various laser scanners or optical readers in fixed-mount installations, or portable installations.

Various business operations have come to rely upon the accuracy and availability of data collected from product automatic identification as a result of code reading. Therefore, the readers are required to not only deal with multiple symbologies, but also variation caused by printing errors and optical distortion. Usually there is a trade-off between the reading robustness on damaged codes and capability of tolerating distortions. When direct part marking becomes essential for tracking and traceability in highly complex and sensitive assembly systems, such as aerospace and defense systems, medical devices, and electronic assemblies, a robust decoding is the highest priority.

To achieve highly robust decoding, automated readers of two-dimensional images typically require the condition that the code be placed on a planar surface (so as to avoid high-order non-linear distortion), and the condition that the optical axis of a lens of the reader be placed perpendicularly with respect to the planar surface (so as to avoid perspective distortion). If a finder pattern of a symbology to be read is not distorted, it can be located according to its unique geometric characteristics (U.S. Pat. No. 6,128,414). Difficulties arise when these two conditions cannot be satisfied due either to the geometry of the product, or to a spatial limitation as to where the reader can be placed with respect to the product. The expected geometric characteristics of the finder pattern of a symbology in question may be distorted to an extent that an automated identification is difficult and time consuming, if not impossible.

There are two known solutions to these problems. The first solution is to use a locating and decoding method that can detect and tolerate various types of symbol damage and symbol distortion. A method for reading MaxiCode symbology with distortion is described in U.S. Pat. No. 6,340,119. A method for reading Code One symbology with perspective distortion is described in U.S. Pat. No. 5,862,267. To achieve a reader of multiple symbologies, a locating, and decoding method for each symbology needs to be devised (U.S. Pat. No. 6,097,839). To allow for reading distorted symbols of multiple symbology, each symbology-specific locating and decoding method needs to be modified so as to detect and tolerate distortion. However, this solution requires some undesirable trade-offs. It not only slows down the process of locating and decoding a symbol due to added computational complexity, but also reduces the reader's ability to handle burst noise, such as damaged codes.

The second solution is to employ camera calibration as widely used in 3D computer vision. Camera calibration is performed by observing a calibration object whose geometry in 3-D space is known with very good precision. The calibration object may consist of two or three planes orthogonal to each other, or a plane with checkerboard pattern that undergoes a precisely known translation. However, these approaches require an expensive calibration apparatus and an elaborate setup, as taught in O. Faugeras, Three-Dimensional Computer Vision: a Geometric Viewpoint, MIT Press, 1993, for example. An easy-to-use method for calibrating an image acquisition system with a camera being stationary with respect to a fixture frame of reference is disclosed in U.S. Pat. No. 6,798,925. This method requires using a non-rotationally symmetric fiducial mark having at least one precise dimension and being placed at a predetermined location on an object. These requirements are necessary for a machine vision system whose purpose is to measure or align an object. In comparison, it is not necessary to know or compute dimensions for a machine vision system whose purpose is to automatically identify an object based on reading a symbol, within which the information is encoded as different reflectance or emission of an assembly of modules, instead of the dimension of the modules. In addition, the requirement of a camera being at a fixed distance with respect to a surface of a fixture frame of reference may not be satisfied for a fixed-mount symbol reader that needs to read symbols off a variety of different surfaces of different heights, or a hand-held symbol reader that may be placed at variable distances from the objects carrying symbols.

SUMMARY OF THE INVENTION

The invention enables reading of distorted optical symbols using known locating and decoding methods, without requiring a separate and elaborate camera calibration procedure, without excessive computational complexity, and without compromised burst noise handling. The invention exploits a distortion-tolerant method for locating and decoding 2D code symbols to provide a correspondence between a set of points in an acquired image and a set of points in the symbol. Then, a coordinate transformation is constructed using the correspondence. Run-time images are then corrected using the coordinate transformation. Each corrected run-time image provides a distortion-free representation of a symbol that can be read by traditional code readers that usually are unable to read distorted symbols. The method can handle both optical distortion and printing distortion. The method is applicable to "portable" readers when an incident angle with the surface is maintained, the reader being disposed at any distance from the surface.

In one general aspect of the invention, a method is provided for decoding distorted symbols. The method includes, at train-time: acquiring a training image of a two-dimensional (2D) code symbol disposed on a train-time surface using a camera with an optical axis having an incident angle with respect to the train-time surface; running a 2D code symbol reader that can detect and tolerate distortion so as to provide a correspondence between at least two 2D coordinates of points within the training image and at least two 2D coordinates of points within the 2D code symbol; and using the correspondence to construct a coordinate transformation. The method includes, at run-time: disposing a symbol on a run-time surface that is substantially parallel to the train-time surface; acquiring a run-time image of a symbol disposed on the run-time surface using a camera with an optical axis having substantially the incident angle with respect to the run-time surface; correcting distortion of the run-time image using the coordinate transformation to provide a corrected image; and running a run-time symbol reader on the corrected image.

In a preferred embodiment, the run-time symbol reader can read damaged symbols.

In another preferred embodiment, the 2D code symbol is a matrix code symbol. In a further preferred embodiment, the 2D code symbol is one of a Data Matrix symbol, a QR Code symbol, a MaxiCode symbol, a Code One symbol, and an Aztec Code symbol.

In yet another preferred embodiment, the 2D code symbol can be read by a reader that provides at least two feature points having well-defined correspondence with expected locations in the symbol.

In another preferred embodiment, the coordinate transformation is at least one of a geometric transformation and a non-linear transformation.

In a further preferred embodiment, running a run-time symbol reader on the corrected image includes providing at least two 2D coordinates of points within the run-time symbol in the corrected image, the method further includes applying an inverse of the coordinate transformation to the at least two 2D coordinates of points to provide mapped versions of the at least two 2D coordinates of points. In a yet further preferred embodiment, the mapped versions of the at least two 2D coordinates of points are displayed within the run-time image so as to define an outline of the run-time symbol. In another further preferred embodiment, the mapped versions of the at least two 2D coordinates of points are analyzed.

In a further preferred embodiment, after running a symbol reader on the corrected image, the method further includes computing quality metrics of the symbol within the corrected image.

In another embodiment, the surface includes a non-planar surface.

In a preferred embodiment, the coordinate transformation includes at least one of an affine transformation portion, a perspective transformation portion, and a high-order non-linear transformation portion.

In various preferred embodiment, the run-time symbol is one of a two-dimensional matrix code symbol, a stacked code, a linear barcode, and a text block.

In other embodiments, the run-time symbol is a matrix code symbol of different scale than the matrix code symbol in the training image. In yet other embodiments, the run-time symbol is a matrix code symbol having a different number of modules than included in the matrix code symbol in the training image. In still other embodiments, the run-time symbol is a matrix code symbol having different information content from the information content of the matrix code symbol in the training image.

In some embodiments, the run-time symbol is not a matrix code symbol.

In a preferred embodiment, running the 2D code reader includes
establishing correspondence based on multiple feature points as supported by the 2D code reader.

In another preferred embodiment, running the 2D code reader includes establishing correspondence based on corner points of a polygonal 2D code symbol.

In another preferred embodiment, running the 2D code reader includes establishing correspondence based on four corner points of a quadrilateral 2D code symbol.

In another preferred embodiment, the coordinate transformation is a perspective coordinate transformation constructed using the correspondence established based on four corner points of a quadrilateral 2D code symbol.

In another preferred embodiment, the camera is a projective camera.

In still another preferred embodiment, the surface is not normal with respect to an optical axis of an image sensor of the camera. In some embodiments, the method further includes, at train-time, mounting a camera at a three-dimensional position fixed relative to a train-time surface upon which run-time symbols will be presented.

In some embodiments, the run-time image is one of the train-time image, a copy of the train-time image, a derivative of the train-time image, a portion of the train-time image, and an equivalent of the train-time image.

In another embodiment, the corrected image corresponds to a portion of the run-time image. In still another embodiment, the corrected image corresponds to a full run-time image.

In another general aspect of the invention, a method is provided for decoding distorted symbols, the method comprising: acquiring a train-time image of a 2D code symbol, the 2D code symbol showing distortion in the train-time image; running a 2D code symbol reader on the training image, the 2D code symbol reader being able to detect and tolerate distortion so as to provide a correspondence between at least two 2D coordinates of points within the train-time image and two 2D coordinates of points within the 2D code symbol; using the correspondence to construct a coordinate transformation; acquiring a run-time image of a symbol under the same conditions as the acquiring of the train-time image of the 2D code symbol; correcting distortion of the run-time image using the coordinate transformation to provide a corrected image; and running a run-time symbol reader on the corrected image.

In a preferred embodiment, the run-time symbol shows the distortion of the train-time symbol; and the distortion includes at least one of an optical distortion and a printing distortion.

In yet another general aspect of the invention, a method is provided for decoding distorted symbols, the method including acquiring a run-time image of a symbol, the symbol showing distortion in the run-time image; obtaining a coordinate transformation that describes the distortion shown in the image of the symbol; correcting distortion shown in the run-time image using the coordinate transformation so as to provide a corrected image; and running a run-time symbol reader on the corrected image.

In a preferred embodiment, the coordinate transformation is constructed using a correspondence between at least two 2D coordinates of points within a train-time image and two 2D coordinates of points within a 2D code symbol. The correspondence is provided by a 2D code symbol reader that can detect and tolerate distortion of the 2D code symbol.

In another preferred embodiment, the distortion includes at least one of an optical distortion and a printing distortion.

In another general aspect of the invention, a method is provided for decoding distorted symbols. The method includes, at train-time: acquiring a training image of a two-dimensional (2D) code symbol disposed on a train-time surface using a camera with an optical axis having an incident angle with respect to the train-time surface; running a 2D code symbol reader that can detect and tolerate distortion so as to provide a correspondence between at least two 2D coordinates of points within the training image and at least two 2D coordinates of points within the 2D code symbol; and using the correspondence to construct a coordinate transformation. The method includes, at run-time: disposing a symbol on a run-time surface that is substantially parallel to the train-time surface; acquiring a run-time image of a symbol disposed on the run-time surface using a camera with an optical axis having substantially the incident angle with respect to the run-time surface; correcting distortion of the run-time image using the coordinate transformation to provide a corrected representation of the symbol; and running a run-time symbol reader on the corrected representation of the symbol.

In a preferred embodiment, the corrected representation of the symbol is a corrected image of the symbol. In another preferred embodiment, the corrected representation of the symbol is a corrected feature of the symbol.

BRIEF DESCRIPTION OF THE DRAWING

The invention will be more fully understood by reference to the detailed description, in conjunction with the following figures, wherein.

DETAILED DESCRIPTION

Figure 1:
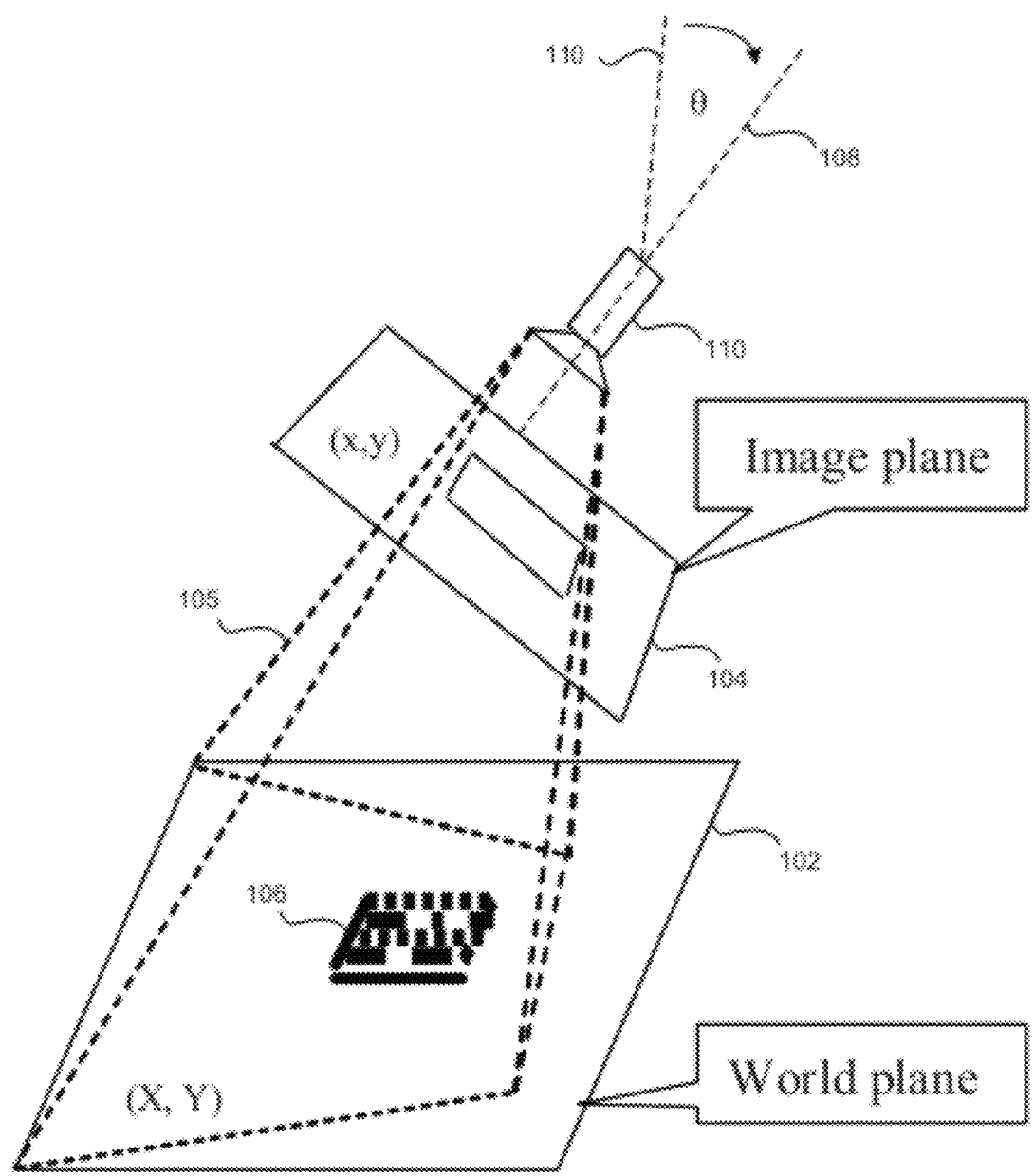
FIG. 1 is an illustration of a projective camera model, wherein a quadrilateral in world plane is mapped to a quadrilateral in an image plane.

Referring to FIG. 1, a preferred embodiment of the invention provides methods for calibrating a projective camera model of a camera 100, for which a perspective transformation 105 exists, between a world plane 102 and an image plane 104. The world plane 102 bears a code symbol 106.

In general, the method of the invention can be used with other camera models, such as a simplified model with variable zoom, or a more complicated model including a lens with barrel or pin-cushion distortion, and with transformations other than geometric transformations and perspective transformations, such as a polynomial transformation, as long as a correspondence can be established using multiple feature points, as will be explained further below.

The method of the invention is applicable to mounted cameras for reading symbols, as well as to "portable" symbol readers, provided that the incident angle θ between an optical axis 108 of the camera (or the symbol reader) and a normal vector 110 of the surface 102 is substantially maintained. Thus, the distance of the camera (or the symbol reader) 100 relative to the surface 102 does not need to be "fixed"; the camera or reader 100 can move along the optical axis 108 and operate at any point away from the surface 102, but not too far away, as limited by the focal length and resolution of the camera or reader 100.

Figure 2:
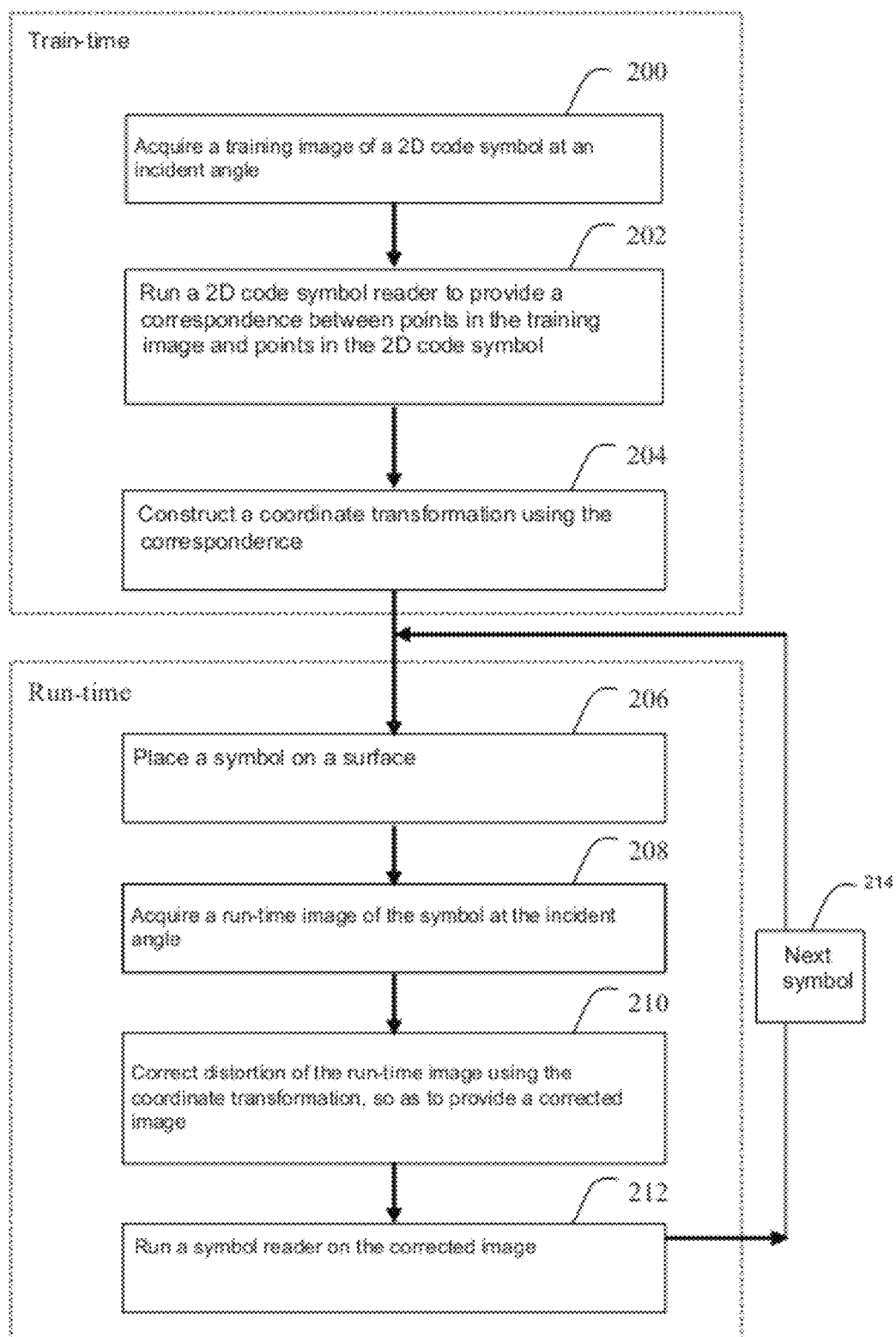
FIG. 2 is a flow diagram of the method of the invention.

Referring to FIG. 2, the method of the invention is divided into train-time steps and run-time steps, wherein the train-time steps are performed before the run-time steps, and the run-time steps are typically repeated 214 after the train-time steps.

At train-time, a training image is acquired 200 that includes a two-dimensional (2D) code symbol 300 (as shown in FIGS. 3, 5, 7, 9, and 11) disposed on a train-time surface 310 using a camera 100 with an optical axis 108 having an incident angle θ with respect to the train-time surface 310. The surface 310 can be flat, or it can be curved.

Next, a 2D code symbol reader is run 202 that can detect and tolerate distortion so as to provide a correspondence between at least two 2D coordinates of points within the training image and at least two 2D coordinates of points within the 2D code symbol. The complexity of the transformation to be constructed at train-time decides the number of points that need to be detected and involved in the correspondence. A correspondence between at least four 2D coordinates of points within the training image and at least four 2D coordinates of points within the 2D code symbol is required to construct a perspective transformation, for example. A correspondence between fewer points is needed for constructing a simpler transformation, for example, an affine transformation. Most conventional code readers that can read distorted 2D codes require implementing symbology-specific locating and decoding methods that can tolerate distortion. Such techniques are disclosed in U.S. Pat. No. 6,340,119 He, et. al, Techniques for Reading Two Dimensional Code, including MaxiCode, and U.S. Pat. No. 5,862,267 Liu, Method and Apparatus for Locating Data Regions in Stored Images of Symbols for Code One symbology, for example.

Then, using the correspondence, a coordinate transformation is constructed 204, as will be explained in detail below. The coordinate transformation can be a geometric transformation, a perspective transformation, or it could be a non-linear transformation, for example.

At run-time, a symbol is placed 206 on a run-time surface that is substantially parallel to or the same as the train-time surface 310.

Then, a run-time image is acquired 208 of a symbol disposed on the run-time surface using a camera with an optical axis having substantially the same incident angle θ with respect to the run-time surface. The symbol can be of a code of a different symbology with respect to the symbol used at train-time, or the symbol can be of the same symbology, but of different scale and/or dimensions. Further, the symbol is not limited to being selected from a two-dimensional code. The symbol can be selected from a stacked code, or from a linear barcode, or from a text block, for example.

Next, distortion of the run-time image is corrected 210 using the coordinate transformation so as to provide a corrected image, as will be explained further below. Alternatively, the symbol can be represented by one or more features, and if so-represented, then distortion of the run-time image is corrected 210 using the coordinate transformation so as to provide at least one corrected feature.

Then, a run-time symbol reader is run 212 on the corrected image. Alternatively, if the symbol is represented by one or more features, then the run-time symbol reader is run on the corrected features.

Then, a next symbol is to be read, returning to step 206.

Referring again to FIG. 1, when a projective camera is used, a straight line in the world plane 102 is mapped to a straight line in the image plane 104. The transformation 105 between the model plane and its image is often called a perspective transformation or a homography. When the train-time "surface" is a plane 102 that is not normal to the optical axis 108 of the image sensor 100, the nominal grid of a two-dimensional matrix code that is a square in world plane is mapped to an arbitrary quadrilateral in image plane. When at least four corner points of the two-dimensional matrix code can be located, the homography between the model plane and its image can be estimated using a method described in (A. Criminisi, I. Reid, and A. Zisserman, A Plane Measuring Device, Image and Vision Computing, Vol. 17, No. 8, pp 625-634, 1999.):

A projective camera model can be written as M=Hm, where $$M = \begin{bmatrix} XW \\ YW \\ W \end{bmatrix}$$

is a vector of world plane coordinates, $$m = \begin{bmatrix} x \\ y \\ 1 \end{bmatrix}$$

is the vector of image plane coordinates, and H is a matrix transformation. This transformation can be written in more detail as:

$$\begin{bmatrix} XW \\ YW \\ W \end{bmatrix} = \begin{bmatrix} a & b & c \\ d & e & f \\ g & h & 1 \end{bmatrix} \begin{bmatrix} x \\ y \\ 1 \end{bmatrix} \quad (1)$$

With W=gx+hy+1, equation (1) is equivalent to $$\begin{bmatrix} X \\ Y \\ 1 \end{bmatrix} = \frac{\begin{bmatrix} a & b & c \\ d & e & f \\ g & h & 1 \end{bmatrix} \begin{bmatrix} x \\ y \\ 1 \end{bmatrix}}{[g \ h \ 1] \begin{bmatrix} x \\ y \\ 1 \end{bmatrix}} \quad (2)$$

By reorganizing the two sides and group the X and Y terms, we have $$X=ax+by+1c+0d+0e+0f-Xxg-Xyh$$

$$Y=0a+0b+0c+xd+yd+1f-Yxg-Yyh \quad (3)$$

Or in matrix form:

$$\begin{bmatrix} x & y & 1 & 0 & 0 & 0 & -Xx & -Xy \\ 0 & 0 & 0 & x & y & 1 & -Yx & -Yy \\ & & & \cdots & & & & \end{bmatrix} \begin{bmatrix} a \\ b \\ c \\ d \\ e \\ f \\ g \\ h \end{bmatrix} = \begin{bmatrix} X \\ Y \\ \cdots \end{bmatrix} \quad (4)$$

The problem of estimating matrix H becomes solving equation Ax=B. A correspondence between two sets of at least four coordinates of points is needed to estimate the parameter vector x, which has eight unknown variables. Using the correspondence, this equation can be solved by several methods that achieve least-square estimation of the vector x; among these solutions, the simplest although not the most mathematically stable one is to use the pseudo-inverse:

$$Ax=B$$

$$A^TAx=A^TB$$

$$x=(A^TA)^{-1}A^TB$$

Figure 3:
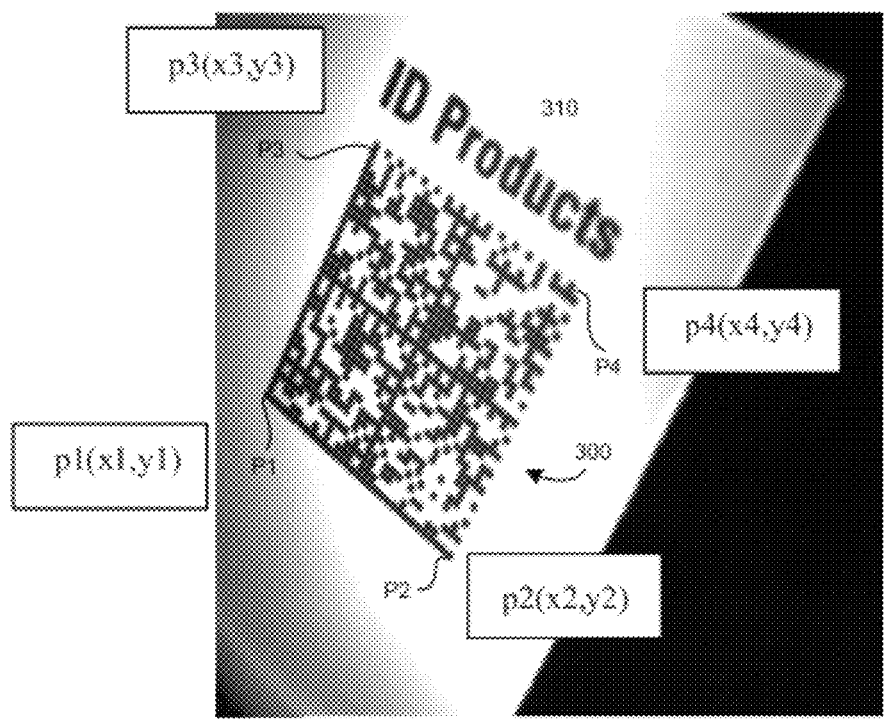
FIG. 3 is a representation of a two-dimensional DataMatrix code that is used to establish a homography between a world plane and an image plane, showing four corner points that have been detected in the image plane of the DataMatrix code, with four respective coordinates $p_i(x_i,y_i)$, i=1, 2, 3, 4, the homography describing a perspective transformation.

Other more robust solutions can be found in W. Press, S. Teukolsky, W. Vetterling, B. Flannery, Numerical Recipes in C, $2^{nd}$ edition, Cambridge University Press, 1992. With four corner points in a two-dimensional matrix code being detected, a correspondence can be established between four coordinates of corner points within the observed image, and their known coordinates in the world plane. When the purpose of this camera calibration is for code reading or quality assessment purpose only, it is not necessary to know the accurate dimension of the code in world plane, as long as a predetermined scale is used to set an expected location for each detected feature point. For example, FIG. 3 shows a two-dimensional DataMatrix code that can be used for establishing the homography between world plane and image plane. In FIG. 3, four corner points are detected in the image plane of the DataMatrix code, with coordinates $p_i(x_i,y_i)$, i=1, 2, 3, 4. Without knowing the exact dimension of the code in the world plane, one can use a predetermined scale, e.g., a nominal module size in image coordinates (referred to as s), to set up imaginary coordinates in world plane. For example, the following correspondence can be set up for a numRow*numCol DataMatrix code:

$$p_1(x_1,y_1) \text{ map to } P_1(X_1,Y_1)=(0,0);$$

$$p_2(x_2,y_2) \text{ map to } P_2(X_2,Y_2)=(0,\text{numCol}*s);$$

$$p_3(x_3,y_3) \text{ map to } P_3(X_3,Y_3)=(\text{numRow}*s,0);$$

$$p_4(x_4,y_4) \text{ map to } P_4(X_4,Y_4)=(\text{numRow}*s,\text{numCol}*s).$$

Figure 4:
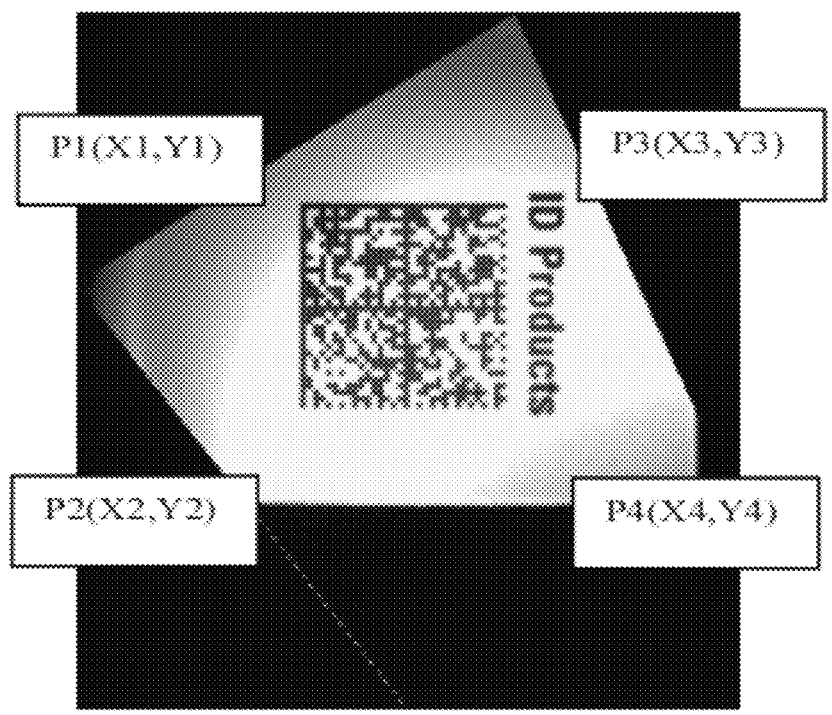
FIG. 4 is a representation of the two-dimensional DataMatrix code in FIG. 3 after the homography matrix is applied, mapping the coordinates $p_i(x_i,y_i)$ to $P_i(X_i, Y_i)$, and thereby correcting any image that is acquired with the same camera model.

After the homography matrix is estimated, every pixel in the run-time image or a derivative of the run-time image can be mapped to an imaginary plane that is parallel to the world plane. This step can correct any image that is acquired with the same camera model to assume that the image is acquired on a plane normal to the optical axis of the camera. Such an image is shown in FIG. 4.

After step 212, i.e., after a symbol (one of two dimensional code, stacked code, or linear barcode) is detected and decoded in the corrected image, its coordinates in the original image can be obtained using the pseudo-inverse of the homography or other nonlinear transformation obtained in step 204:

$$M=Hm$$

$$H^T M = H^T H m$$

$$m=(H^T H)^{-1} H^T M$$

Thus, the detected and decoded symbol is mapped back to the train-time image plane for display and analysis.

Figure 5A:
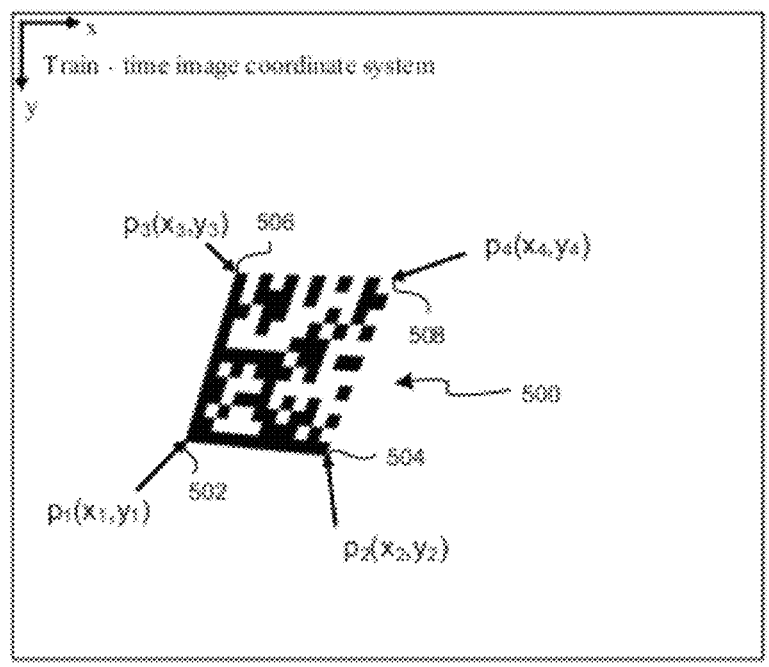
FIG. 5A shows an example of a train-time image of a DataMatrix code symbol showing perspective distortion as a result of using a camera with an optical axis having a non-zero incident angle with respect to a train-time planar surface.

FIG. 5A shows an example of a train-time image of a DataMatrix code symbol 500 showing perspective distortion, as a result of using a camera with an optical axis having a non-zero incident angle with respect to a train-time planar surface upon which the DataMatrix code symbol is disposed with an orientation, such as shown in FIG. 1. After running a DataMatrix reader that can detect and tolerate distortion, the symbol 500 can be decoded, and 2D coordinates of four corner points 502, 504, 506, 508 of the symbol 500 can be obtained in the train-time image space, i.e., $p_i(x_i,y_i)$, i=1, 2, 3, 4.

Figure 5B:
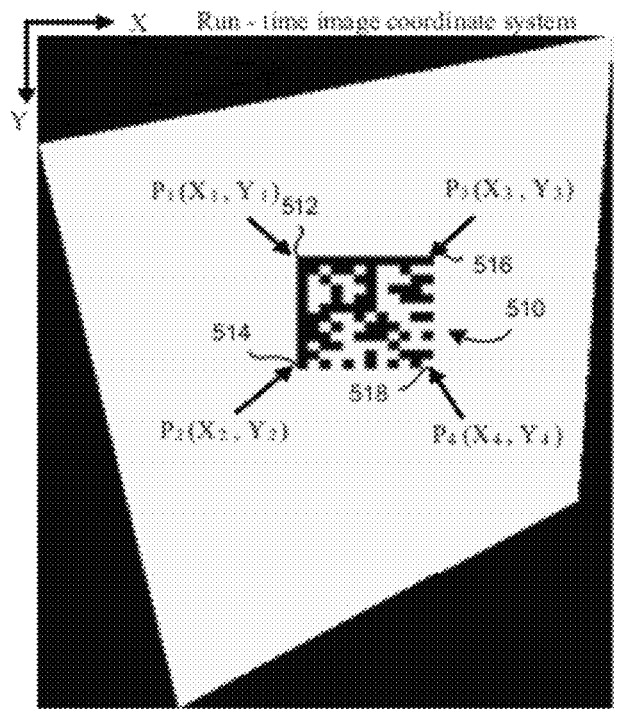
FIG. 5B shows a corrected image obtained by applying the perspective transformation to a run-time image that is an equivalent of the train-time image in FIG. 5A.

FIG. 5B shows a corrected image obtained by applying a perspective transformation, H, to a run-time image that is an equivalent of the train-time image in FIG. 5A. The perspective transformation is constructed by a correspondence between the coordinates of the four corner points 502, 504, 506, 508 in train-time image space shown in FIG. 5A and the coordinates of the four transformed corner points 512, 514, 516, 518 in the transformed symbol 510 as shown in the run-time image space, i.e., $p_i(x_i,y_i)$ corresponds to $P_i(X_i,Y_i)$, i=1, 2, 3, 4.

Figure 6A:
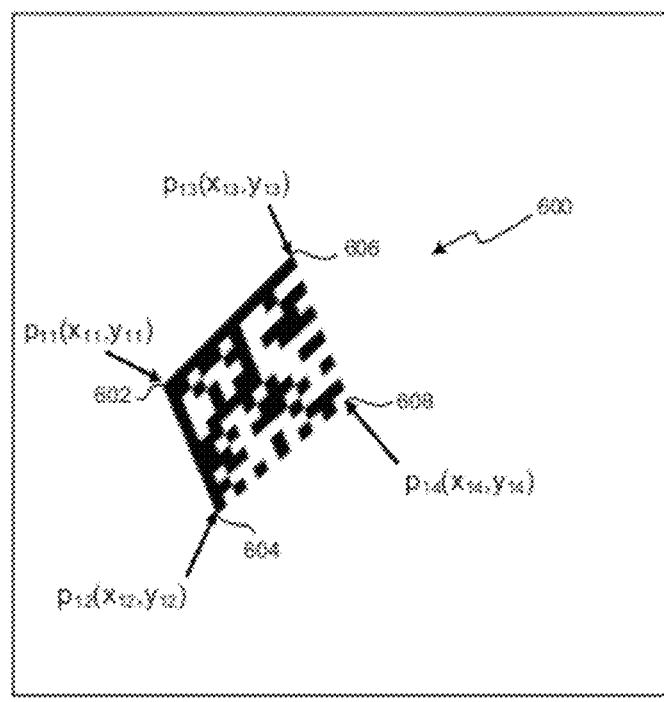
FIG. 6A shows another example of a run-time image of the DataMatrix code symbol in FIG. 5A, disposed with a second orientation on the train-time surface, showing perspective distortion.

FIG. 6A shows another example of a run-time image, acquired at the incident angle with respect to the train-time surface, of the DataMatrix code symbol 500 in FIG. 5A. The symbol 600 is an equivalent of symbol 500 being disposed with a second orientation on the train-time surface. The symbol 600 shows the perspective distortion, and has corner points 602, 604, 606, and 608.

Figure 6B:
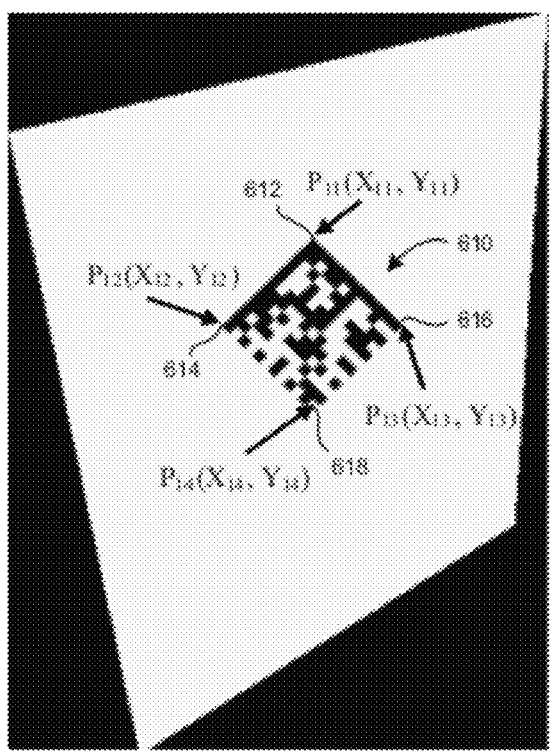
FIG. 6B shows a corrected image obtained by applying the perspective transformation to the run-time image of FIG. 6A, providing a symbol with no distortion.

FIG. 6B shows a corrected image obtained by applying the perspective transformation, H, to the run-time image of FIG. 6A. The transformed symbol 610 shows no distortion. After running a DataMatrix reader on the corrected image, coordinates of four corner points 612, 614, 616, and 618 in the symbol 610 are obtained in the corrected image space: $P_{1i}(X_{1i},Y_{1i})$, i=1, 2, 3, 4. After applying an inverse of the perspective transformation, $(H^T H)^{-1} H^T$, to $P_{1i}$, i=1, 2, 3, 4, their mapped versions are coordinates of four corner points 602, 604, 606, and 608 in the symbol in the run-time image space, i.e., $p_{1i}(x_{1i},y_{1i})$, i=1, 2, 3, 4. These mapped versions define an outline (not shown) of the DataMatrix symbol 600 in the run-time image, as shown in FIG. 6A.

Figure 7A:
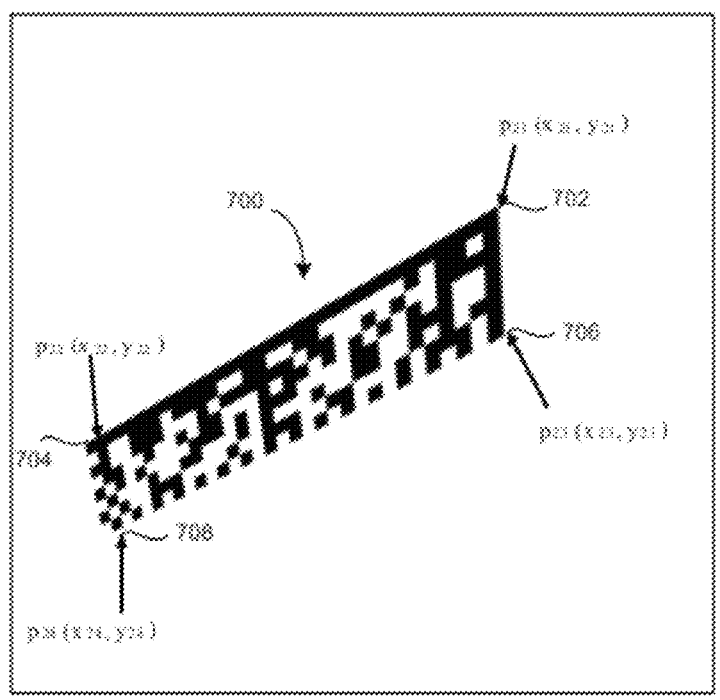
FIG. 7A shows another example of a run-time image of a DataMatrix code symbol with different symbol size than that shown in FIG. 5A, disposed with yet another orientation on the train-time surface, the symbol showing perspective distortion.

FIG. 7A shows another example of a run-time image of a DataMatrix code symbol 700 with different symbol size than the size of the symbol 500 shown in FIG. 5A, disposed in yet another orientation on the train-time surface. The symbol 700 exhibits perspective distortion, and has four corner points 702, 704, 706, 708.

Figure 7B:
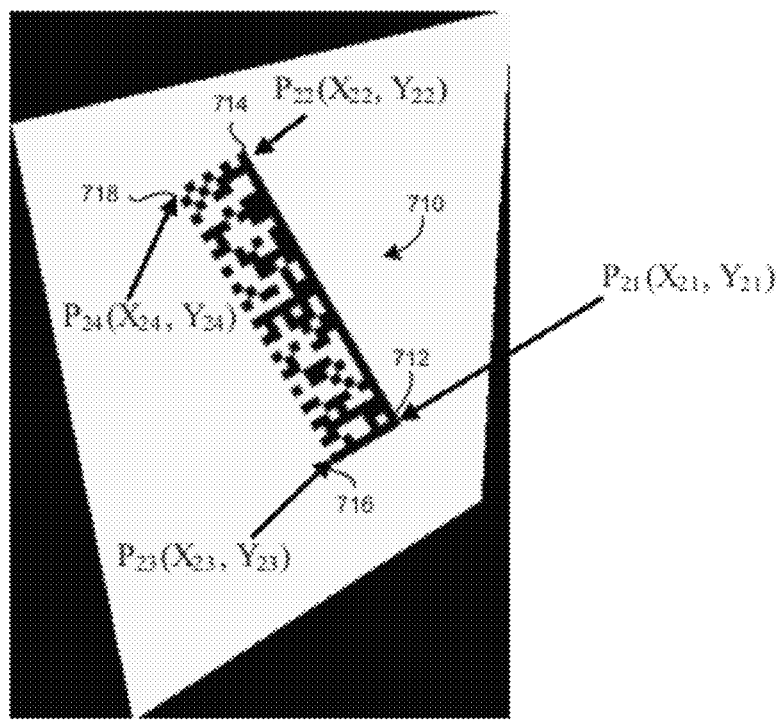
FIG. 7B shows a corrected image obtained by applying the perspective transformation to the run-time image of FIG. 7A, the symbol showing no distortion.

FIG. 7B shows a corrected image obtained by applying the perspective transformation, H, to the run-time image of FIG. 7A. The transformed symbol 710 shows no distortion. After running a DataMatrix reader on the corrected image, coordinates of four corner points 712, 714, 716, and 718 in the symbol 710 are obtained in the corrected image space: $P_{2i}(X_{2i},Y_{2i})$, i=1, 2, 3, 4. After applying an inverse of the perspective transformation, $(H^T H)^{-1} H^T$, to $P_{2i}$, i=1, 2, 3, 4, their mapped versions are coordinates 702, 704, 706, and 708 of four corner points in the symbol in the run-time image space, i.e., $p_{2i}(x_{2i},y_{2i})$, i=1, 2, 3, 4. These mapped versions define an outline of the DataMatrix symbol 700 in the run-time image, as shown in FIG. 7A.

Figure 8A:
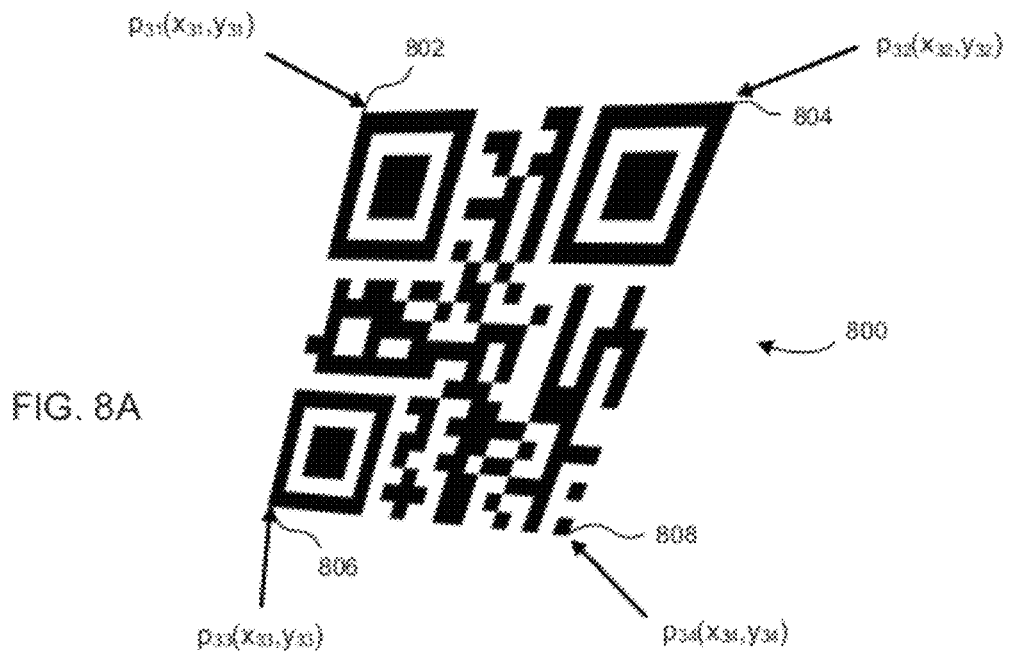
FIG. 8A shows yet another example of a run-time image of a QRCode symbol, disposed with yet another orientation on a run-time surface parallel to the train-time surface, the symbol showing perspective distortion.

FIG. 8A shows yet another example of a run-time image of a QRCode symbol 800, disposed in yet another orientation on a run-time surface that is parallel to, but not co-planar with respect to, the train-time surface. The symbol 800 shows the perspective distortion, and includes corner points 802, 804, 806, and 808.

Figure 8B:
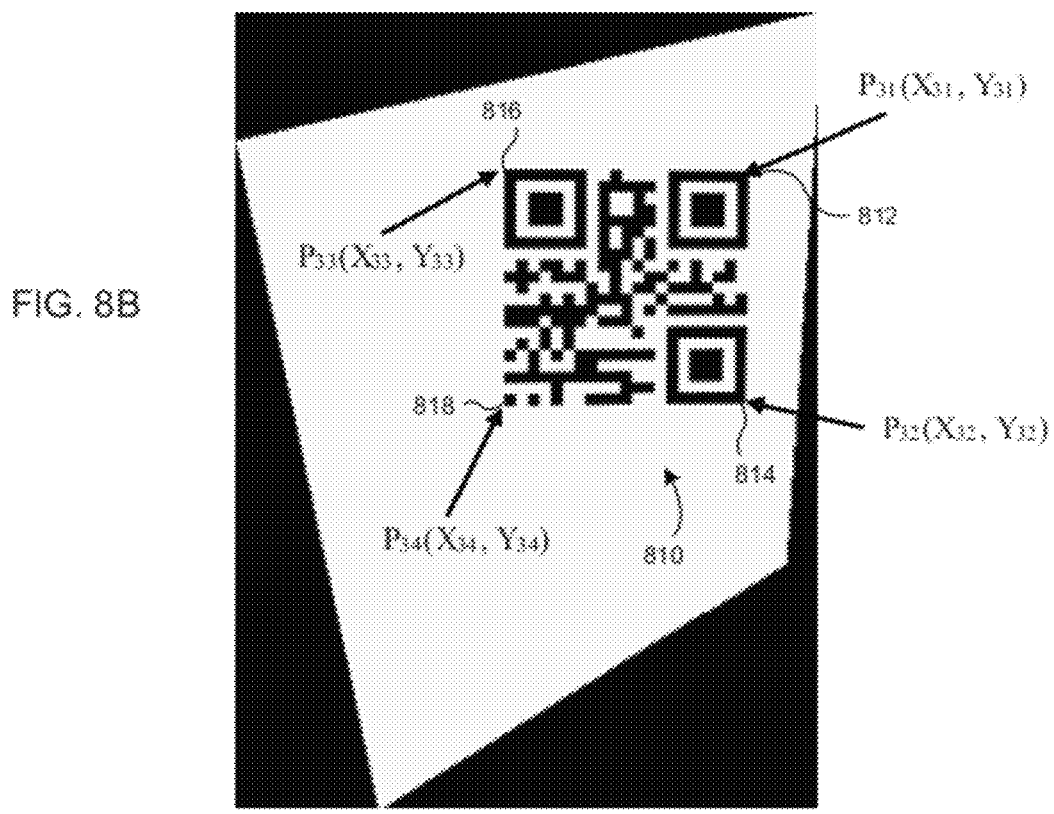
FIG. 8B shows a corrected image obtained by applying the perspective transformation to the run-time image of FIG. 8A, the symbol showing no distortion.

FIG. 8B shows a corrected image obtained by applying the perspective transformation, H, to the run-time image of FIG. 8A. The symbol 810 shows no distortion. After running a QRCode reader on the corrected image, coordinates of four corner points 812, 814, 816, and 818 in the symbol may be obtained in the corrected image space: $P_{3i}(X_{3i},Y_{3i})$, i=1, 2, 3, 4. After applying an inverse of the perspective transformation, $(H^T H)^{-1} H^T$, to $P_{3i}$, i=1, 2, 3, 4, their mapped versions are coordinates of four corner points 802, 804, 806, and 808 in the symbol 800 in the run-time image space, i.e., $p_{3i}(x_{3i},y_{3i})$, i=1, 2, 3, 4. These mapped versions define an outline of the QRCode symbol 800 in the run-time image, as shown in FIG. 8A.

Figure 9A:
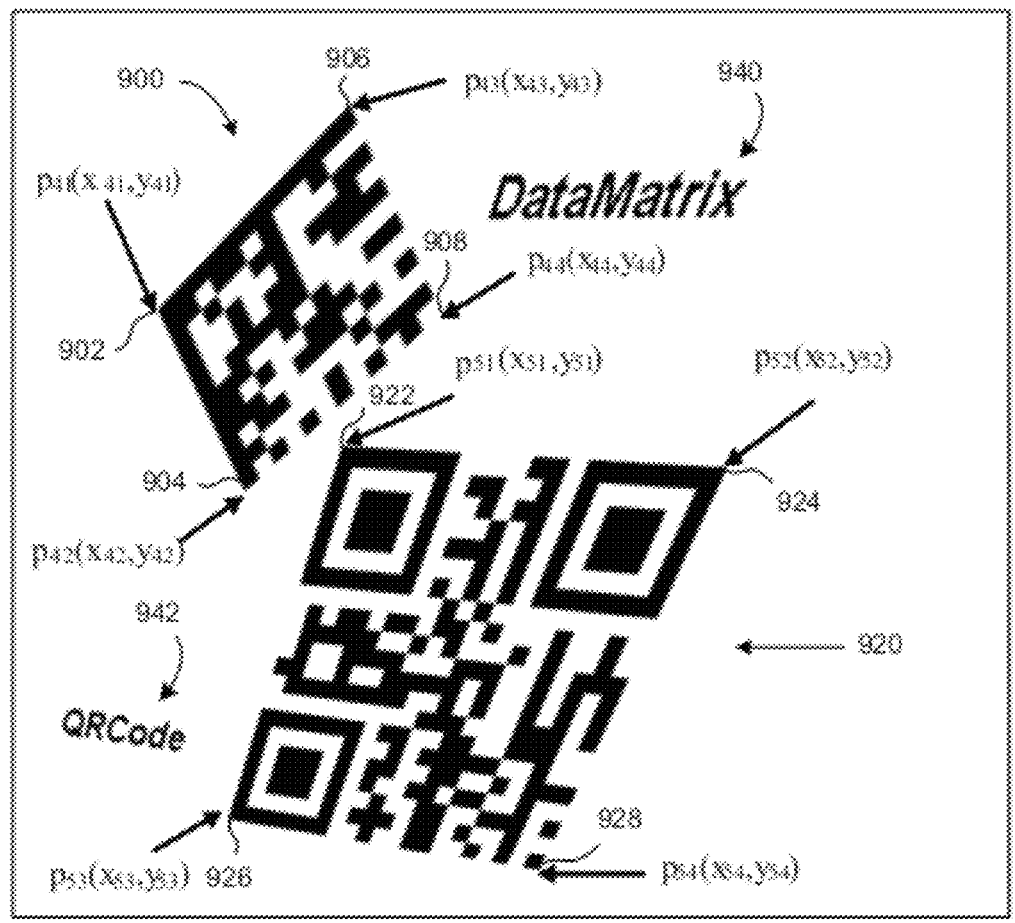
FIG. 9A shows an example of a train-time image of a DataMatrix code symbol, a QRCode symbol, and two text blocks of human readable strings that are disposed on a planar surface, the symbols and text blocks showing perspective distortion in the image, as a result of using a camera with an optical axis having a non-zero incident angle with respect to the surface.

FIG. 9A shows an example of a train-time image of a DataMatrix code symbol 900, a QRCode symbol 920, and two text blocks 940, 942 of human readable strings that are disposed on a planar surface. The symbols 900, 920 and text blocks 940, 942 show perspective distortion in the image, as a result of using a camera with an optical axis having a non-zero incident angle with respect to the surface. After running a DataMatrix reader that can detect and tolerate distortion, the DataMatrix symbol 900 can be decoded, and 2D coordinates of four corner points of the symbol 902, 904, 906, 908 can be obtained in the train-time image space, i.e., $p_{4i}(x_{4i},y_{4i})$, i=1, 2, 3, 4.

Figure 9B:
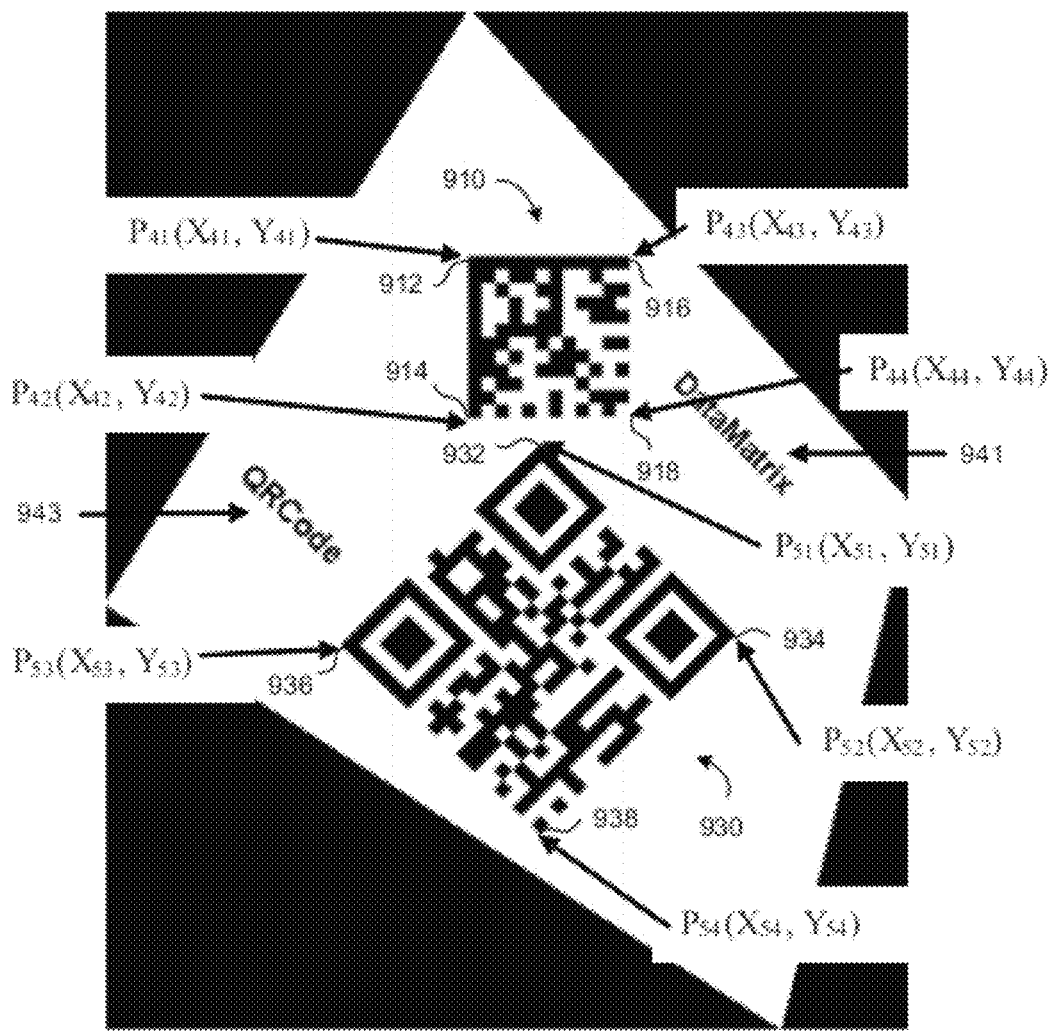
FIG. 9B shows a corrected image obtained by applying a perspective transformation to a run-time image that is an equivalent of the train-time image in FIG. 9A, the symbols and text blocks showing no distortion in the corrected image.

FIG. 9B shows a corrected image obtained by applying a perspective transformation, $H_1$, to a run-time image that is an equivalent of the train-time image in FIG. 9A. The symbols 910, 930 and text blocks 941, 943 show no distortion in the corrected image. The perspective transformation is constructed by a correspondence between the coordinates of the four corner points 902, 904, 906, 908 of the DataMatrix symbol 900 in train-time image space and the coordinates of the four corner points 912, 914, 916, 918 in the symbol 910 as shown in the run-time image space, i.e., $p_{4i}$ ($x_{4i},y_{4i}$) corresponds to $P_{4i}(X_{4i},Y_{4i})$, i=1, 2, 3, 4. After running a QRCode reader on the corrected image, coordinates of four corner points 932, 934, 936, 938 in the QRCode symbol 930 are obtained in the corrected image space: $P_{5i}(X_{5i},Y_1)$, i=1, 2, 3, 4. After applying an inverse of the perspective transformation, $(H_1^T H_1)^{-1} H_1^T$, to $P_{5i}$, i=1, 2, 3, 4, their mapped versions are coordinates of four corner points 922, 924, 926, 928 in the symbol 920 in the run-time image space, i.e., $p_{5i}(x_{5i},y_{5i})$, i=1, 2, 3, 4. These mapped versions define an outline of the QRCode symbol 920 in the run-time image, as shown in FIG. 9A.

Other modifications and implementations will occur to those skilled in the art without departing from the spirit and the scope of the invention as claimed. Accordingly, the above description is not intended to limit the invention except as indicated in the following claims.

What is claimed is:

1. A method for decoding distorted symbols, the method comprising acquiring a run-time image of a symbol, the symbol showing distortion in the run-time image;
    obtaining a coordinate transformation that describes the distortion shown in the image of the symbol; and
    using a processor, where the processor corrects distortion shown in the run-time image using the coordinate transformation so as to provide a corrected image;
    running a run-time symbol reader on the corrected image; and
    wherein the coordinate transformation is constructed using a correspondence between at least two 2D coordinates of points within a train-time image and two 2D coordinates of points within a 2D code symbol, the correspondence being provided by a symbol reader that can detect and tolerate distortion of the 2D code symbol.

2. The method of claim 1 wherein the run-time symbol reader includes the processor.

3. A method for decoding distorted symbols, the method comprising the steps of:
    at train-time:
    acquiring a training image of a code symbol disposed on a train-time surface using a camera with an optical axis forming an incident angle with respect to the train-time surface;
    running a code symbol reader that can detect and tolerate distortion so as to provide a correspondence between at least two coordinates of points within the training image and at least two coordinates of points within the code symbol;
    using the correspondence to construct a coordinate transformation;
    at run-time:
    acquiring a run-time image of a symbol disposed on a run-time surface using a camera with an optical axis forming substantially the incident angle with respect to the run-time surface;
    correcting distortion of the run-time image using the coordinate transformation to provide a corrected representation of the symbol; and
    running a run-time symbol reader on the corrected image.

4. The method of claim 3, wherein the code symbol disposed on the train-time surface is of a type that is different from the symbol disposed on the run-time surface.

5. The method of claim 3 wherein the code symbol disposed on the train-time surface is a stacked code symbol.

6. The method of claim 3 wherein the code symbol disposed on the train-time surface is a linear bar code symbol.

7. The method of claim 3 wherein the code symbol disposed on the train-time surface is a text block.

8. The method of claim 3, wherein the corrected representation of the symbol is a corrected image of the symbol.

9. The method of claim 3 wherein the coordinate points in the train-time image and in the run-time image are 2D coordinate points.

10. The method of claim 3, wherein the train-time surface includes a non-planar surface.

11. A method for decoding distorted symbols, the method comprising the steps of:
    at train-time:
    acquiring a train-time image of a code symbol disposed on a train-time surface;
    generating a coordinate transformation that describes distortion shown in the train-time image;
    at run-time:
    acquiring a run-time image of a symbol, the symbol showing distortion in the run-time image;
    correcting distortion shown in the run-time image using the coordinate transformation so as to provide a corrected representation of the symbol; and
    running a run-time symbol reader on the corrected image.

12. The method of claim 11, wherein the step of generating a coordinate transformation is constructed using a correspondence between at least two coordinates of points within a train-time image and two coordinates of points within a code symbol, the correspondence being provided by a symbol reader that can detect and tolerate distortion of the code symbol.

13. The method of claim 11, wherein the distortion includes at least one of an optical distortion and a printing distortion.

14. The method of claim 11, wherein the code symbol is a two-dimensional (2D) code symbol.

15. The method of claim 11, wherein the train-time image is acquired using a camera having an optical axis that forms an incident angle with respect to the train-time surface and wherein the run-time image is acquired using a camera having an optical axis that forms substantially the incident angle with respect to the train-time surface.

16. An apparatus for decoding distorted symbols, the apparatus comprising:
    at least a first processor programmed to perform the steps of, at train-time:
    acquiring a training image of a code symbol disposed on a train-time surface using a camera with an optical axis having an incident angle with respect to the train-time surface;
    identifying a correspondence between at least two coordinates of points within the training image and at least two coordinates of points within the code symbol;
    using the correspondence to construct a coordinate transformation;

at run-time:
 acquiring a run-time image of a symbol disposed on a run-time surface using a camera with an optical axis having substantially the incident angle with respect to the run-time surface;
 correcting distortion of the run-time image using the coordinate transformation to provide a corrected representation of the symbol; and
 running a run-time symbol reader on the corrected image.

17. The apparatus of claim 16, wherein the code symbol disposed on the train-time surface is of a type that is different from the symbol disposed on the run-time surface.

18. An apparatus for decoding distorted symbols, the apparatus comprising:
 at least a first processor programmed to perform the steps of,
 at train-time:
 acquiring a train-time image of a code symbol disposed on a train-time surface;
 generating a coordinate transformation that describes distortion shown in the train-time image;
 at run-time:
 acquiring a run-time image of a symbol, the symbol showing distortion in the run-time image;
 correcting distortion shown in the run-time image using the coordinate transformation so as to provide a corrected representation of the symbol; and
 running a run-time symbol reader on the corrected image.

19. The apparatus of claim 18, wherein the processor generates a coordinate transformation by using a correspondence between at least two coordinates of points within a train-time image and two coordinates of points within a code symbol, the correspondence being provided by a symbol reader that can detect and tolerate distortion of the code symbol.

20. The apparatus of claim 18, wherein the train-time image is acquired using a camera having an optical axis that forms an incident angle with respect to the train-time surface and wherein the run-time image is acquired using a camera having an optical axis that forms substantially the incident angle with respect to the train-time surface.

21. The apparatus of claim 18, wherein the corrected representation of the symbol is a corrected image of the symbol.

22. The apparatus of claim 18, wherein the corrected representation of the symbol is a corrected feature of the symbol.

23. The apparatus of claim 18, wherein the code symbol disposed on the train-time surface is of a type that is different from the symbol disposed on the run-time surface.

* * * * *